United States Patent [19]

Mori

[11] Patent Number: 4,470,820
[45] Date of Patent: Sep. 11, 1984

[54] SUNSHINE SIMULATOR

[76] Inventor: Kei Mori, 3-16-3-501, Kaminoge, Setagaya-ku, Tokyo, Japan

[21] Appl. No.: 452,351

[22] Filed: Dec. 22, 1982

[30] Foreign Application Priority Data

Dec. 29, 1981 [JP] Japan .................................. 56-213048

[51] Int. Cl.³ .......................... G09B 9/00; G09B 25/04
[52] U.S. Cl. ..................................................... 434/72
[58] Field of Search .................... 434/72, 290; 354/80, 354/81, 290, 291, 292, 293

[56] References Cited

U.S. PATENT DOCUMENTS

| 2,328,456 | 8/1943 | Humphreys | 434/72 |
| 2,550,805 | 5/1951 | Greenfield | 434/290 |
| 3,068,574 | 12/1962 | Bieg | 434/72 X |
| 3,303,582 | 2/1967 | Farquhar | 434/290 X |
| 3,495,516 | 2/1970 | Henderson | 354/290 X |

FOREIGN PATENT DOCUMENTS

| 2643647 | 4/1977 | Fed. Rep. of Germany | 434/72 |
| 200913 | 8/1967 | U.S.S.R. | 434/72 |

Primary Examiner—William H. Grieb
Attorney, Agent, or Firm—Jordan and Hamburg

[57] ABSTRACT

A sunshine simulator includes a support plate (10) for mounting thereon a model (M) of an urban district or building. The support plate (10) is angularly movable about a first axis (Y) which is perpendicular to the general plane of the support plate (10) and, also, about a second axis (X) which is parallel to the general plane of the support plate (10). The model structure (M) mounted on the support plate (10) can be put under any desired sunshine condition relative to a stationary artificial sun.

24 Claims, 6 Drawing Figures

SUNSHINE SIMULATOR

BACKGROUND OF THE INVENTION

The present invention relates to a sunshine simulator which is capable of simulating the sunshine in a desired district.

When the construction of high buildings is planned in a built-up area or that of a new town in a wasteland, timberland or seaside, it is a primary requisite to carry out a survey of the influence of the expected buildings on the environment with respect to the sunshine before actually starting on the construction. The influence of buildings and the like on the environment has customarily been estimated by quite rough calculations on the desk. This, however, prevents one from visually confirming the actual conditions of the sunshine in the intended cite. Such, coupled with the fact that the sunshine has been sampled only several times a day at the maximum (e.g. 7.00 am, 12.00 pm and 6.00 pm), makes it impractical to foresee the accurate transition of the sunshine condition before constructing buildings or the like at the cite. Because the sunshine, whether intense or not, has critical influence on our living environment, it is desirable to attain visible information on the influence in an analog or continuous fashion as far as possible, while recording the information for future use.

SUMMARY OF THE INVENTION

A sunshine simulator embodying the present invention includes a member for mounting a model thereon. A first rotation means causes the model mount member into rotation about a first axis which intersects with the model mount member. The first rotation means supports the model mount member thereon. A frame member supports the first rotation means thereon and is rotatable about a second axis which is parallel to the general plane of the model mount member. A second rotation means causes the frame member into rotation about the second axis and is operatively connected with the frame member.

In accordance with the present invention, a sunshine simulator includes a support plate for mounting thereon a model of an urban district or building. The support plate is angularly movable about a first axis which is perpendicular to the general plane of the support plate and, also, about a second axis which is parallel to the general plane of the support plate. The model structure carried on the support plate can be put under any desired sunshine condition relative to a stationary artificial sun.

It is an object of the present invention to provide a sunshine simulator which is capable of continuously simulating the varying sunshine in any desired district and the influence concerned therewith.

It is another object of the present invention to provide a generally improved sunshine simulator.

Other objects, together with the foregoing, are attained in the embodiments described in the following description and illustrated in the accompanying drawings.

DESCRIPTION OF THE PREFERRED EMBODIMENTS

While the sunshine simulator of the present invention is susceptible of numerous physical embodiments, depending upon the environment and requirements of use, substantial numbers of the herein shown and described embodiments have been made, tested and used, and all have performed in an eminently satisfactory manner.

Figure 1:
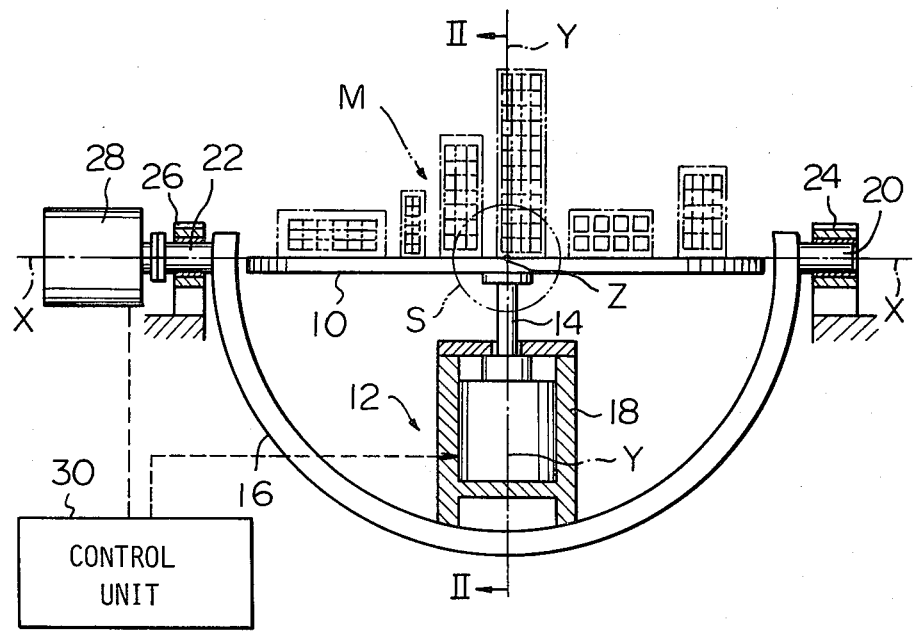
FIG. 1 is a fragmentary vertical section of a sunshine simulator embodying the present invention.
Figure 2:
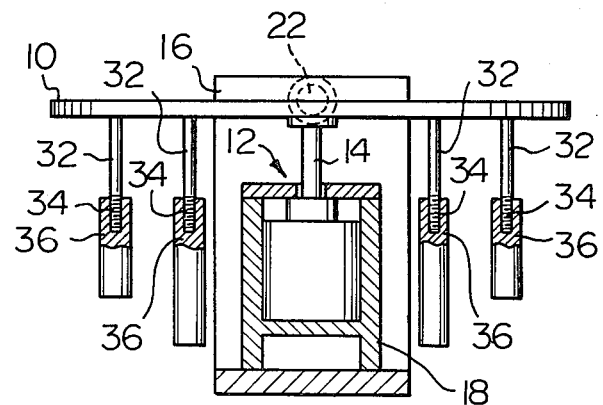
FIG. 2 is a section along line II—II of FIG. 1.
Figure 3:
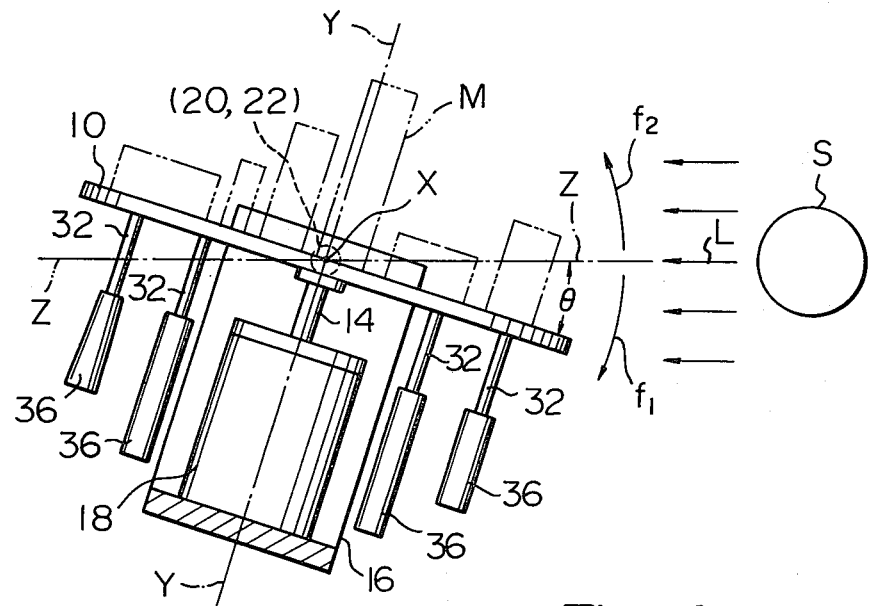
FIG. 3 is an elevation of the sunshine simulator in operation.

Referring to FIGS. 1-3 of the drawings, the sunshine simulator includes a flat support plate or table 10 which may be shaped circular or rectangular. The support plate 10 is adapted to support a model M of, for example, an urban district or buildings. Generally designated by the reference numeral 12 is a first rotation device which is located just below the central part of the support plate 10 and includes a rotary shaft 14. The support plate 10 is rigidly mounted on the rotary shaft 14 and driven thereby angularly about a Y-axis. The first or Y-axis rotation device 12 may comprise a pulse motor or a stepping motor, an AC motor or a DC motor, although such is only illustrative and may be replaced by any other suitable device, as long as it is capable of moving a short distance at a time.

The Y-axis rotation device 12 is carried on a frame member 16 which is positioned below the table 10. The frame member 16 has thereon a hollow cylindrical casing 18 adapted to securely retain the rotation device 12 thereinside. The frame 16 has a generally semiarcuate configuration whose center of curvature is defined by the center of the table 10. Horizontal stub shafts 20 and 22 extend radially outward from diametrically opposite ends of the frame 16 and are respectively rotatably supported by bearings 24 and 26. A second rotation device 28 is in driving connection with one 22 of the stub shafts so that the frame 16 may be driven for angular movement about a horizontal X-axis, which extends along the upper surface of the table 10. Again, the second or X-axis rotation device 28 may comprise a stepping motor or a pulse motor, an AC motor or a DC motor, for example.

With the construction described above, it will be clear that the table 10 is movable angularly not only about the Y-axis which is perpendicular thereto but about the X-axis which is parallel thereto.

Both the Y- and X-axis rotation devices 12 and 28 are connected by electrical wiring to a control unit 30 which supplies them with control signals. The control unit 30 includes a control panel which is provided with various buttons and the like for manipulation to rotate the X- and Y-axis rotation devices 28 and 12 by desired angles.

Figure 4:
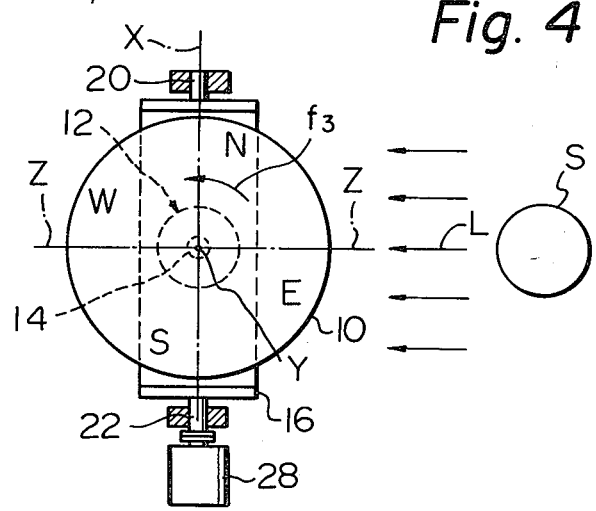
FIG. 4 is a schematic plan view of the sunshine simulator in operation.

As shown in FIGS. 1, 3 and 4, an artificial sun S is held stationary on a Z-axis which is perpendicular to the X- and Y-axes and at a spacing from the table 10. The artificial sun S emits false sunlight L to illuminate the model M on the table 10. Thus, rotating the table 10 about the Y-axis varies the direction (latitudinal) of the model M relative to the sun S, while rotating the table 10 about the X-axis changes the altitude (longitudinal) of the sun S relative to the model M.

Further, a plurality of rods 32 extend from the underside of the table 10 in symmetrical positions with respect to the horizontal X-axis, as shown in FIG. 2. Each rod 32 is provided with a threaded portion 34 at its end so as to be engaged by a desired balance weight 36. Such an arrangement permits the table 10 to remain in a balanced stationary position when inclined by the second or X-axis rotation device 28 as illustrated in FIG. 3.

The operation of the sunshine simulator described above will be described taking for example the sunshine assessment for high buildings, which are to be constructed in a built-up urban district. A prepared model M of the buildings in the urban district is fixed by suitable means on the table 10. At the same time, the control unit 30 is operated to input various data concerning the intended district such as the longitude and latitude thereof, path of movement of the sun in the specific district during the day, etc. Then, the control unit 30 drives the Y- and X-axis rotation devices 12 and 28 based on the input data, so that their associated table 10 and frame 16 are respectively moved about the Y- and X-axes to set up the varying sunshine particular to the district. When it is desired to fix the sunshine to one condition which corresponds to a specific time of the day, the X- and Y-axis rotation devices 28 and 12 will be stopped at the desired time through the control unit 30.

The sunshine simulator will be operated as follows to simulate the sunshine in a certain district in the northern hemisphere, for example.

Referring to FIG. 4, the east (E), west (W), south (S) and north (N) positions are supposed on the table 10 as illustrated with respect to the sunrise time in the district concerned. Then, the table 10 is held in the horizontal position at the time of sunrise. Stated another way, the sun rises from the east-northeast in the season and district in question. As the sun rises, the table 10 becomes progressively tilted about the X-axis by the rotation device 28 toward the sun S, as indicated by an arrow $f_1$ in FIG. 3. Simultaneously, the table 10 is progressively rotated counterclockwise about the Y-axis by the rotation device 12 as indicated by an arrow $f_3$ in FIG. 4. When the sun S is highest (at noon for example), the table 10 has been tilted about the X-axis up to the maximum rotation angle (although dependent upon the district) and, accordingly, the angle $\theta$ of the upper surface of the table 10 relative to the horizontal has reached the maximum. As the sun gets lower thereafter, the table 10 is rotated counterclockwise this time about the X-axis as indicated by an arrow $f_2$ in FIG. 3, while continuing its counterclockwise rotation about the Y-axis as viewed in FIG. 4. At the sunset, the support plate 10 has been rotated by the Y-axis rotation device 12 until the supposed west-northwest position has come to be aligned with the sun S and, at the same time, rotated in the opposite direction by the X-axis rotation device 40 to the position parallel to the Z-axis. It will be seen that the sunshine in the southern hemisphere can be simulated in the same way although not described for simplicity.

Figure 5:
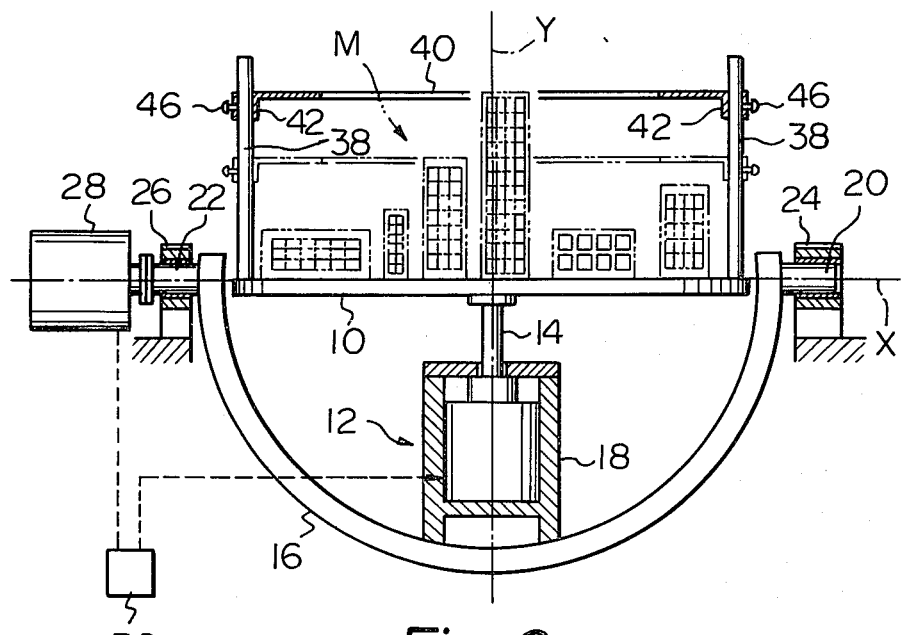
FIG. 5 is a fragmentary vertical section of another embodiment of the present invention.
Figure 6:
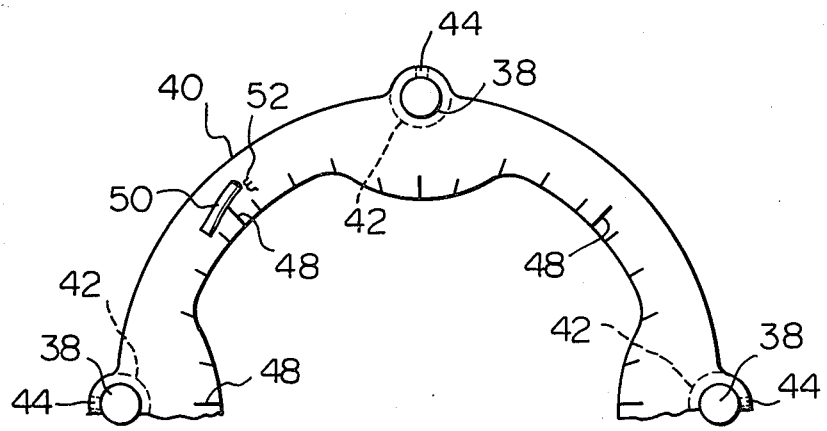
FIG. 6 is a fragmentary enlarged plan view of the sunshine simulator shown in FIG. 5.

Referring to FIG. 5 a modified embodiment of the present invention is shown which permits a camera or the like to be fixedly loaded in an operative position on the sunshine simulator. As shown, a plurality of posts 38 are detachably mounted upright on the table 10 as by screwing along the peripheral edge of the table 10. A generally annular camera mount 40 is supported by the posts 38 to be movable up and down therealong and extends along the peripheral edge of the table 10. The camera mount 40 is formed with tubular sections 42 at spaced locations along the circumference in order to receive the posts 38 therethrough. Each tubular section 42 has a threaded hole 44 into which a clamping screw 46 is to be driven. Driving the clamping screws 46 into the threaded holes 44 clamps the camera mount 40 to the posts 38. As seen in FIG. 6, the camera mount 40 is provided with graduations 48 on its top which indicate center angles or directions with respect to the center axis Y. The graduations 48 show an orientation of a camera which may be loaded on the mount 40. A band 50 and a buckle 52 are carried on the camera mount 40 as means for fastening a camera to the mount 60, although such is not restrictive but may be replaced by another fastening means.

When the camera mount 40 is fixed to the posts 38 on the table 10, the optical axis of a camera loaded on the mount 40 will be kept parallel to the top of the table 10 even though the latter may be tilted as shown in FIG. 3. The camera, therefore, will shoot the structure M on the table 10 as practically as a structure on a horizontal plane.

In summary, it will be seen that the present invention provides a sunshine simulator which can continuously simulate the sunshine in any district in the world and in any one of four seasons while keeping the record of the simulation or not. The district may even be the one close to the North Pole or the South Pole where the daytime or nighttime lasts all day long. Additionally, the simulator moves the ground relative to the artificial sun which is stationary. This renders the construction simple and compact to facilitate installation of the simulator even in a limited space.

Various modifications will become possible for those skilled in the art after receiving the teachings of the present disclosure without departing from the scope thereof. For example, the step motors or the pulse motors employed in the foregoing embodiments as the X- and Y-axis rotation devices 28 and 12 may be replaced by prime movers which are operated by fluid pressures. The electrical wiring between the rotation devices 28 and 12 and the control unit 30 will then be replaced by fluid piping. Furthermore, the control unit 30 may be constructed to operate a camera in addition to the rotation devices, with or without the camera mount automatically moved up and down along the posts.

What is claimed is:

1. A sunshine simulator comprising:
   a member for mounting a model thereon;
   a plurality of balance weights which are detachably mounted on the model mounting member;
   a first rotation means for causing rotation of said model mounting member about a first axis which intersects with the model mounting member, said first rotation means supporting the model mounting member thereon;
   a frame member for supporting the first rotation means thereon and rotatable about a second axis which is parallel to the general plane of the model mounting member; and
   a second rotation means for causing rotation of said frame member about the second axis, said second rotation means being operatively connected with the frame member.

2. A sunshine simulator as claimed in claim 1, in which the model mounting member comprises a circular plate.

3. A sunshine simulator as claimed in claim 1, in which the model mounting member comprises a rectangular plate.

4. A sunshine simulator as claimed in claim 1, in which the model is a model building.

5. A sunshine simulator as claimed in claim 1, in which the model is a model urban district.

6. A sunshine simulator as claimed in claim 1, in which the first rotation means comprises a stepping motor.

7. A sunshine simulator as claimed in claim 1, in which the first rotation means comprises an AC motor.

8. A sunshine simulator as claimed in claim 1, in which the first rotation means comprises a DC motor.

9. A sunshine simulator as claimed in claim 1, in which the first rotation means comprises a prime mover operated by fluid pressure.

10. A sunshine simulator as claimed in claim 1, further comprising a rotary shaft rigidly connected to the model mounting member, the first rotation means having an output shaft which is connected to said rotary shaft.

11. A sunshine simulator as claimed in claim 2, in which the frame member has a substantially semiarcuate configuration whose center of curvature coincides with the center of the model mounting member.

12. A sunshine simulator as claimed in claim 1, in which the frame member comprises a hollow cylindrical casing for fixedly accommodating the first rotation means thereinside and a pair of horizontal stub shafts which extend from the outer periphery of opposite ends of the frame member away from each other, said stub shafts rotatably mounting the first rotation means to a rigid member of a body of the simulator each through a bearing.

13. A sunshine simulator as claimed in claim 1, in which the second rotation means comprises a stepping motor.

14. A sunshine simulator as claimed in claim 1, in which the second rotation means comprises an AC motor.

15. A sunshine simulator as claimed in claim 1, in which the second rotation means comprises a DC motor.

16. A sunshine simulator as claimed in claim 1, in which the second rotation means comprises a prime mover operated by fluid pressure.

17. A sunshine simulator as claimed in claim 12, in which the second rotation means has an output shaft which is operatively connected to one of the horizontal stub shafts.

18. A sunshine simulator as claimed in claim 1, whereupon the plurality of balance weights are mounted on the model mounting member in symmetrical positions with respect to the second axis.

19. A sunshine simulator as claimed in claim 1, further comprising a control means for controlling the rotation angles of the first and second rotation means to set up on the model mounting member the sunshine at a desired time of a desired season in a desired district, said control means being operatively connected with the first and second rotation means by at least one of electric wiring and fluid piping.

20. A sunshine simulator as claimed in claim 19, in which the control means includes a control panel.

21. A sunshine simulator as claimed in claim 1, further comprising a means for fixing a camera in an operative position, said camera fixing means being detachably mounted on the model mounting member.

22. A sunshine simulator as claimed in claim 21, in which the camera fixing means comprises a plurality of post members removably mounted on the model mounting member and a camera mounting member which is movable up and down along said posts.

23. A sunshine simulator as claimed in claim 22, in which the camera mount member comprises a fixture for a camera and graduations which indicate center angles or directions of the model mount member with respect to the first axis.

24. A sunshine simulator as claimed in claim 23, in which the fixture for a camera comprises a band and a buckle.

* * * * *